United States Patent
Hansen

(10) Patent No.: US 11,440,600 B1
(45) Date of Patent: Sep. 13, 2022

(54) SNOWMOBILE RAIL BRACE

(71) Applicant: Trevor Hansen, Ogden, UT (US)

(72) Inventor: Trevor Hansen, Ogden, UT (US)

( * ) Notice: Subject to any disclaimer, the term of this patent is extended or adjusted under 35 U.S.C. 154(b) by 0 days.

(21) Appl. No.: 17/560,990

(22) Filed: Dec. 23, 2021

(51) Int. Cl.
*B62D 55/10* (2006.01)
*B62D 55/32* (2006.01)
*B62M 27/02* (2006.01)

(52) U.S. Cl.
CPC ............ *B62D 55/10* (2013.01); *B62D 55/32* (2013.01)

(58) Field of Classification Search
CPC ........ B62D 55/10; B62D 55/32; B62D 55/30; B62D 55/07; B62M 2027/026; B62M 2027/027; B62M 27/02; B60G 2300/322
USPC .......... 180/193; 305/127, 128, 130; 280/900
See application file for complete search history.

(56) References Cited

U.S. PATENT DOCUMENTS

| | | | | |
|---|---|---|---|---|
| 4,093,033 A * | 6/1978 | Rosch | ............... | B62D 55/07 180/9.56 |
| 4,314,618 A * | 2/1982 | Tamura | ............... | B62M 27/02 180/9.56 |
| 4,987,965 A * | 1/1991 | Bourret | ............... | B62M 27/02 180/9.56 |
| 5,860,486 A * | 1/1999 | Boivin | ............... | B62D 55/108 180/193 |
| 6,109,382 A * | 8/2000 | Kubota | ............... | B62M 27/02 305/141 |
| 6,112,840 A * | 9/2000 | Forbes | ............... | B62K 3/002 180/193 |
| 7,918,299 B2 * | 4/2011 | Yoshihara | ............... | B62M 27/02 305/128 |
| 7,975,794 B2 * | 7/2011 | Simmons | ............... | B62M 27/02 305/120 |
| 9,771,130 B2 | 9/2017 | Beavis | | |
| 2015/0034404 A1 * | 2/2015 | Polakowski | ............... | B62M 27/02 180/193 |
| 2018/0244326 A1 * | 8/2018 | Zuchoski | ............... | A63C 5/035 |
| 2020/0047831 A1 * | 2/2020 | Bates, Jr. | ............... | B62D 55/07 |
| 2020/0094918 A1 * | 3/2020 | Beavis | ............... | B62D 55/07 |

OTHER PUBLICATIONS https://www.backwoodsbmp.com/product-page/alpha-full-rail-brace, retrieved on Dec. 23, 2021.
https://tkicnc.com/product/arctic-cat-alpha-rail-brace/, retrieved on Dec. 23, 2021.

* cited by examiner

*Primary Examiner* — Anne Marie M Boehler
(74) *Attorney, Agent, or Firm* — Parsons Behle & Latimer

(57) ABSTRACT

A rail brace system is designed for use with a snowmobile monorail. The rail brace system includes a brace having a first end, a second end, a length extending from the first end to the second end, a top side, a bottom side, a height extending from the top side to the bottom side, an inner surface, an outer surface, and a width extending between the inner surface and the outer surface. The inner surface is shaped complementary to a first side of a monorail of a snowmobile. The brace includes an opening extending through the width. The brace extends towards the second end to provide support to the monorail. The opening is positioned along the length of the brace to be concentric to a suspension mount hole of the monorail and the outer surface around the opening is configured to provide a mounting surface for a suspension arm.

30 Claims, 6 Drawing Sheets

SNOWMOBILE RAIL BRACE

FIELD OF THE DISCLOSURE

The embodiments described herein relate generally to accessories for vehicles designed to traverse snow. In particular, the disclosure relates to a brace for a monorail of a snowmobile.

BACKGROUND

Snowmobiles are vehicles designed to travel over snow by using one or more skis and a track driven by an engine. Traditionally, the track was supported upon a plurality of a rails and accompanying idler wheels. Examples of snowmobiles include both dual-ski systems as well as single-ski systems, also known as snow bikes, and conversion kits. Over the years, performance of snowmobiles has increased in both performance and handing. In some instances, snowmobiles are designed for particular purposes, such as touring, climbing, and/or agility.

As one example, U.S. Pat. No. 9,771,130 was awarded to Arctic Cat Inc. for a "snowmobile skid frame assembly" (also referred to as a monorail) and is incorporated herein by reference in its entirety. Additionally, Arctic Cat Inc. released a snowmobile using a single-beam rear suspension under the brand name Alpha One™. FIGS. 9 and 10 show an embodiment of a known monorail 500 for a snowmobile. Monorail 500 has a length extending from a first end 501 to a second end 502. First end 501 is a rear end of monorail 500 and second end 502 is a front end of monorail 500 when oriented in the manner used on the snowmobile. Monorail 500 includes a first side 503, a second side 504, a first mounting block 505 on first side 503 and a second mounting block 506 on second side 504. A suspension arm (not shown in FIGS. 9 and 10) connects into both first mounting block 505 and second mounting block 506 to support the suspension arm upon the monorail 500. Monorail 500 includes a suspension mount hole 507 extending through first side 503 and/or second side 504 and first mounting block 505 and second mounting block 506. Monorail 500 may have a triangular cross-section, as shown. Monorail 500 includes a top side 510 extending along the length of monorail 500. Top side 510 includes a recess 511 designed to accommodate the placement of suspension components of the snowmobile and/or form a surface for a bump stop to limit travel of the suspension of the snowmobile. Rivets 512 are positioned above and below suspension mount hole 507 to connect first mounting block 505 and second mounting block 506 to monorail 500.

However, in some embodiments of monorail systems, the rail can be broken or separated by a side or non-vertical impact and/or by flexing during impact. The rail can twist or flex, leading to breaking, which can be concentrated at the recess in the top of the rail. Some aftermarket accessory providers have created rail braces that reinforce the rail forward of suspension mount hole 507 and below recess 511 or surround the first mounting block 505 and second mounting block 506. However, this causes forces from within the suspension arm of the snowmobile to be transferred through the rail before reaching the brace. Other disadvantages of known monorail systems and braces may exist.

SUMMARY

The present disclosure is directed to a rail brace for a snowmobile monorail system that improves upon known snowmobile monorail systems and/or overcomes some of the problems and disadvantages discussed above.

An embodiment of a rail brace system is designed for use with a monorail of a snowmobile. The rail brace system includes a brace having a first end, a second end, a length extending from the first end to the second end, a top side, a bottom side, a height extending from the top side to the bottom side, an inner surface, an outer surface, and a width extending between the inner surface and the outer surface. The inner surface is shaped complementary to a first side of a monorail of a snowmobile. The brace includes an opening extending through the width. The brace extends towards the second end to provide support to the monorail. The opening may be closer to the first end than to the second end. The opening is positioned along the length of the brace to be concentric to a suspension mount hole of the monorail and the outer surface around the opening is configured to provide a mounting surface for a suspension arm.

The rail brace system may include a bolt shaped to be received through the opening of the brace and through the suspension mount hole of the monorail. The inner surface may be shaped complementary to the first side of a single-beam rear suspension by Arctic Cat Inc.

The brace may include a plurality of sections extending continuously along its length. The plurality of sections include a first section that contains the first end, a second section that contains the second end, and a middle section positioned between the first end and the second end. The middle section includes a recess on the top side of the brace. The top side may be curved along its length at a transition between the first section and the middle section. The opening may be positioned in the first section.

The brace may include a plurality of fastener holes configured to receive mechanical fasteners. The plurality of fasteners are spread along the length. The brace may include one or more ribs configured to increase rigidity of the brace.

The brace may include an upper portion extending downward from the top side and a lower portion extending upward from the bottom side. A first portion of the outer surface is on the upper portion. A second portion of the outer surface is on the lower portion. The first portion of the outer surface may be non-parallel to the second portion of the outer surface. The opening may be located in the lower portion.

A thickness of the lower portion may be tapered towards the bottom side. A thickness of the upper portion may be tapered towards the top side.

The brace may be a first brace, and the rail brace system may include a second brace. The second brace may be a mirror image of the first brace. The second brace may have a first end, a second end, a length extending from the first end to the second end, a top side, a bottom side, a height extending from the top side to the bottom side, an inner surface, an outer surface, and a width extending between the inner surface and the outer surface. The inner surface is shaped complementary to a second side of the monorail.

The rail brace system may include an upper brace connecting the top side of the first brace to the top side of the second brace. The first brace, the second brace, and the upper brace may form a single piece. The upper brace may include an inner surface shaped complementary to a top side of the monorail. The inner surface of the upper brace may be curved.

The brace may include a mounting block protruding from the outer surface. The opening extends through the mounting block and the mounting block is integral to the brace. The mounting block may be located in the lower portion.

An embodiment of a rail brace system for a snowmobile includes a monorail, a first brace, and a second brace. The monorail is configured for use in a suspension of a snowmobile. The monorail includes a first side, a second side opposite the first side, and a suspension mount hole extending from the first side to the second side.

The first brace has a first end, a second end, a length extending from the first end to the second end, an inner surface complementary to the first side of the monorail and a first opening positioned to align with the suspension mount hole when the first brace is attached to the first side of the monorail. The first opening may be closer to the first end than to the second end.

The second brace has a first end, a second end, a length extending from the first end to the second end, an inner surface complementary to the second side of the monorail and a second opening positioned to align with the suspension mount hole when the second brace is attached to the second side of the monorail. The second opening may be closer to the first end than to the second end.

The rail brace system may include a bolt extending through the opening of the first brace, the suspension mount hole of the monorail, and the second brace. The rail brace system may include an upper brace connecting a top side of the first brace to a top side of the second brace. The first brace, the second brace, and the upper brace may be a single piece. The upper brace may include an inner surface shaped complementary to a top side of the monorail. The inner surface of the first brace and the inner surface of the second brace may be at an angle of between 15 and 60 degrees with respect to each other.

The rail first brace may include an outer surface, an upper portion extending downward from a top side of the first brace, and a lower portion extending upward from a bottom side of the first brace. A first portion of the outer surface is on the upper portion and a second portion of the outer surface is on the lower portion. The first portion of the outer surface may be non-parallel to the second portion of the outer surface. A thickness of the lower portion may be tapered towards the bottom side. The opening may be located in the lower portion.

The first brace may include an outer surface and a first mounting block. The first mounting block is integral to the first brace. The first mounting block may protrude from the outer surface of the first brace. The opening of the first brace extends through the first mounting block.

An embodiment of a method for bracing a monorail of a snowmobile includes attaching a first brace to a first side of a monorail of a snowmobile. The monorail includes the first side, a second side opposite the first side, and a suspension mount hole extending through the first side. The first brace includes a first opening that is aligned with the suspension mount hole of the monorail. The method includes fastening the first brace to a suspension arm of the snowmobile using the suspension mount hole of the monorail.

The method may include attaching a second brace to the second side of the monorail. The second brace includes a second opening that is aligned with the suspension mount hole of the monorail. The method may include fastening the second brace to the suspension arm of the snowmobile using the suspension mount hole of the monorail. Fastening the braces to the suspension arm may include includes inserting a bolt through a suspension arm of the snowmobile.

The method may include removing one or more mounting blocks attached to the monorail before attaching the first brace to the first side of the monorail.

The first brace and the second brace may be part of a single piece with an upper brace connecting a top side of the first brace to a top side of the second brace. Attaching the first brace and attaching the second brace may include placing the single piece over the monorail.

Figure 1:
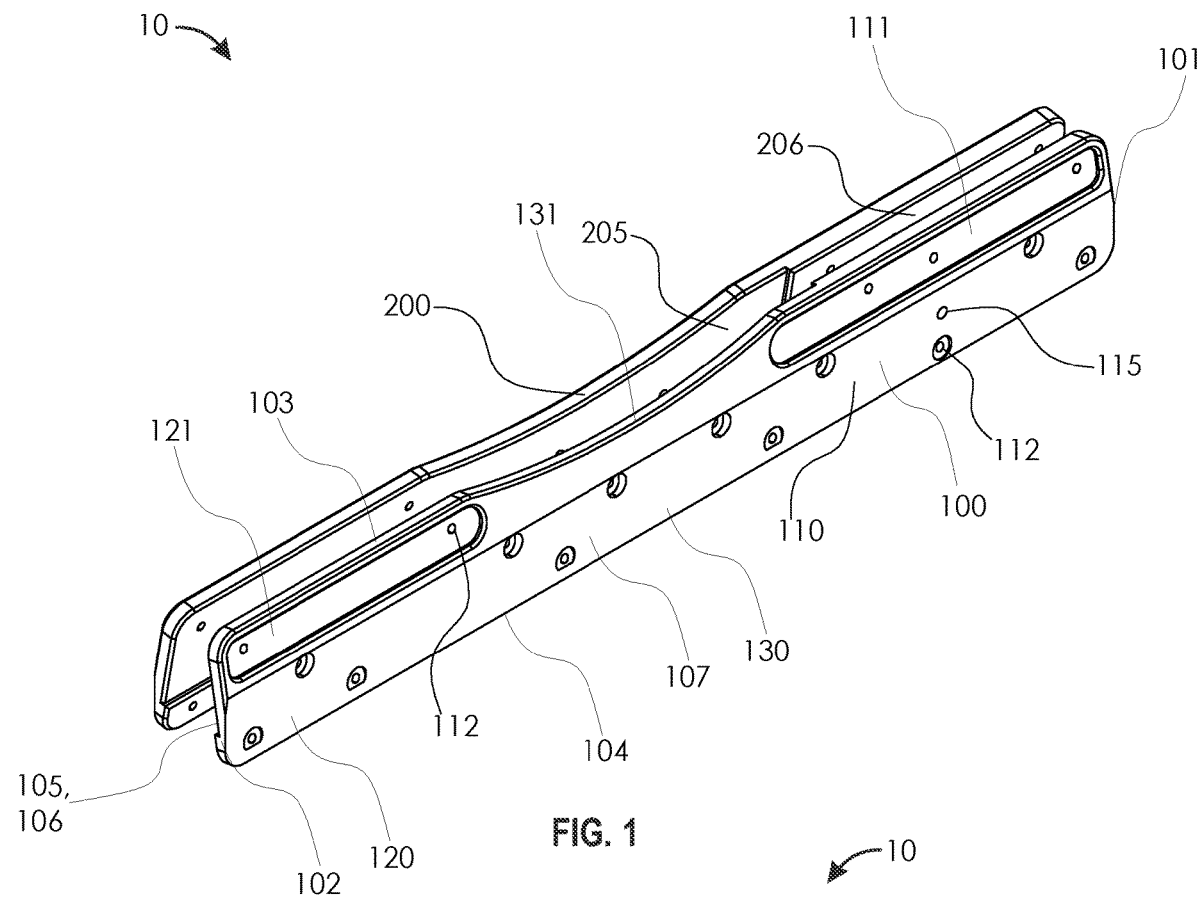
FIGS. 1 and 2 show an embodiment of a rail brace system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of a rail brace system 10 for use with a monorail (not shown in FIG. 1) of a snowmobile. Rail brace system 10 includes a first brace 100 and a second brace 200. Rail brace system 10 may include a bolt 50 (shown in FIGS. 3 and 4). In some embodiments, bolt 50 may be part of the suspension of a stock snowmobile for which the rail brace system 10 is compatible. First brace 100 is shaped complementary to a first side of a monorail and second brace 200 is shaped complementary to a second side of the monorail that is opposite the first side. It may be desirable to increase the contact area of first brace 100 and second brace 200 to the sides of the monorail as would be appreciated by a person of skill in the art having the benefit of this disclosure. Second brace 200 may have some or all of the same features as first brace 100, but be shaped and configured to provide support the second side of the monorail.

Rail brace system 10 may be specifically configured for use with a single-beam rear suspension manufactured and/or sold by Arctic Cat Inc. under the brand name Alpha One™.

First brace 100 includes a first end 101, a second end 102, a length extending from first end 101 to second end 102, a top side 103 extending along the length, a bottom side 104 extending along the length, and a height extending from top side 103 to bottom side 104. The length is greater than the height so as to provide support along the length of the monorail and increase torsional rigidity. First brace 100 includes an inner surface 105, an outer surface 107, and a width extending from inner surface 105 to outer surface 107. Inner surface 105 is shaped complementary to the first side of the monorail. In some embodiments, inner surface 105 may be flat. Inner surface 105 may include one or more stepped profiles or recesses 106 shaped to accommodate features on the first side of the monorail. First brace 100 includes an opening 115 extending through the width of first brace 100. Opening 115 may be a circular opening. The portion of outer surface 107 around opening 115 is configured to provide a mounting surface for a suspension arm of the snowmobile. In some embodiments, the width of first brace 100 around opening 115 may extend along the entire length of first brace 100. Opening 115 is complementary to a suspension mount hole of the monorail that rail brace system 10 is designed to be used with. In some embodiments, the suspension mount hole is a through-hole. In some embodiments, the suspension mount hole is threaded. In some embodiments, the suspension mount hole is drilled-out before installation of rail brace system 10. Opening 115 is positioned along the length of first brace 100 to be concentric to the suspension mount hole. Opening 115 may be closer to first end 101 than to second end 102. The opening 115 is completely surrounded by the material of first brace 100, which may be advantageous for transferring forces from a bolt within opening 115 into first brace 100.

Opening 115 provides a clearance fit for the bolt of the suspension arm. Opening 115 may have a diameter of between ¼ inch and ⅜ inch. First brace 100 may have a length of at least 20 inches, and preferably between 24 inches and 40 inches. Opening 115 is located at least 1 inch from first end 101, measured from the center of opening 115. First brace 100 may extend at least twice as far from opening 115 to second end 102 than from opening 115 to first end 101. First brace 100 extends at least two inches from opening 115 to second end 102, but preferably at least 10 inches. In some embodiments, first brace 100 may have a maximum width of 4 inches. First brace 100 may have a width of between 1.25 inches and 4 inches. Preferably, first brace 100 has a width of 3 inches.

In some embodiments, first brace 100 may have a uniform width along its length. The height at first end 101 may be equal to the height at second end 102. The shape and configuration of first brace 100 may be a mirror image of second brace 200.

First brace 100 is configured to attach to the first side of a monorail of a snowmobile. Second brace 200 is configured to attach to the second side of the monorail. First brace 100 and/or second brace 200 may be attach to the monorail using mechanical fasteners, such as bolts, rivets, and screws, adhesives, welding, or a combination thereof. First brace 100 may include a plurality of fastener holes 112 to receive mechanical fasteners to connect first brace 100 to the monorail. One or more of the plurality of fastener holes 112 may be recessed from a portion of outer surface 107 such that the heads of the mechanical fasteners are contained within first brace 100 when installed. This may be advantageous to minimize snow accumulation upon the brace and/or to reduce surfaces that may be caught be field debris, such as branches. One or more of the plurality of fastener holes 112 may be positioned relative to opening 115 to align with mounting holes of the monorail. A plurality of the plurality of fastener holes 112 are spread along the length of first brace 100 such that they are not vertically aligned with opening 115.

First brace 100 may include a plurality of sections extending continuously along its length. First brace 100 may include a first section 110 that includes first end 101 and a second section 120 that includes second end 102. First section 110 is configured to provide support to a monorail around an attachment point of the snowmobile suspension to the monorail. Second section 120 is configured to provide support to additional portions of the monorail. Opening 115 is positioned in first section 110. First section 110 may include one or more ribs, such as pocket 111, and second section 120 may include one or more ribs, such as pocket 121, to increase rigidity of first section 110 and second section 120. Pockets 111, 121 may also be beneficial to reduce weight of first brace 100. Pockets 111, 121 may be formed in inner surface 105 and/or outer surface 107. Pocket 111 may be positioned above opening 115.

In some embodiments, first brace 100 includes a middle section 130 positioned between first section 110 and second section 120. Middle section 130 includes a recess 131 on top side 103 of first brace 100. Recess 131 may be shaped to provide clearance for suspension components of the snowmobile. Top side 103 may be curved along its length at the transition(s) between middle section 130 and first section 110 and/or second section 120, which may be advantageous to reduce concentration of stresses at the transitions.

Figure 2:
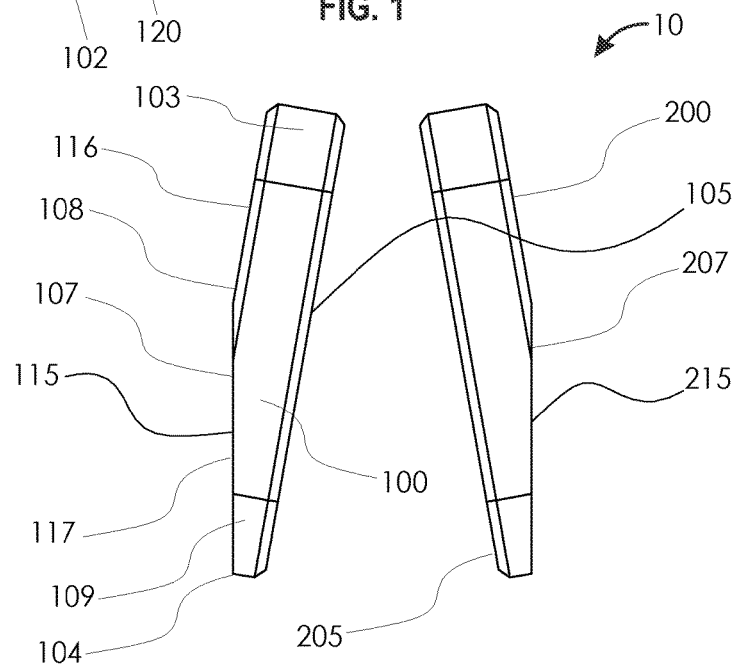

FIG. 2 is an end view of first brace 100 and second brace 200. First brace 100 includes an upper portion 116 extending downward from top side 103 and a lower portion 117 extending upward from bottom side 104. Upper portion 116 and lower portion 117 may each extend along the entire length of first brace 100. Upper portion 116 is connected to lower portion 117 and may join at an angle. A first portion 108 of outer surface 107 is on upper portion 116 and a second portion 109 of outer surface 107 is on lower portion 117. First portion 108 of outer surface 107 may not be parallel to second portion 109 of outer surface 107. The thickness of lower portion 117, which extends from outer surface 107 to inner surface 105, may be tapered towards bottom side 104. This may be advantageous to deflect impacts upon lower portion 117. Upper portion 116 may have a uniform thickness. In some embodiments, upper portion 116 may be tapered towards top side 103. The shape of outer surface 107 forms an integral mounting block for the suspension arm of the snowmobile. The integral mounting block may extend from first end 101 to second end 102.

Opening 115 extends through lower portion 117. Second portion 109 of outer surface 107 forms a surface that interfaces with a portion of suspension arm 60 (shown in FIG. 3) of the snowmobile. Second portion 109 may be at an angle with inner surface 105 such that the surface for interfacing with a portion of suspension arm 60 is vertically oriented when first brace 100 is mounted on the monorail. Second brace 200 includes a corresponding opening 215 extending from an inner surface 205 to an outer surface 207. Inner surface 205 may include one or more stepped profiles or recesses 206 (shown in FIG. 1) shaped to accommodate features on the second side of the monorail.

In some embodiments, first brace 100 and/or second brace 200 are each forged as a single piece. In some embodiments, first brace 100 and/or second brace 200 are each formed, stamped, or machined as a single piece. In some embodiments, first brace 100 and/or second brace 200 are each extruded as a single piece.

Figure 3:
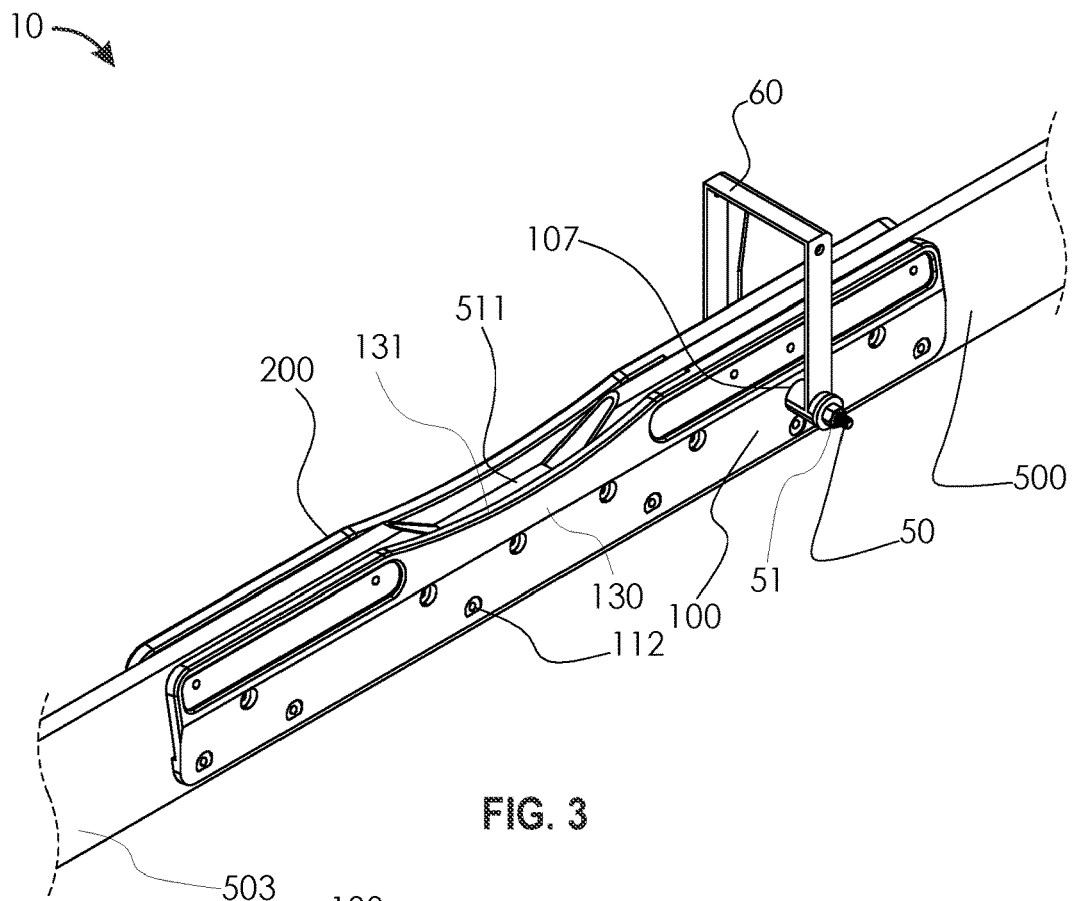
FIGS. 3 and 4 show an embodiment of a rail brace system installed on a monorail.
Figure 4:
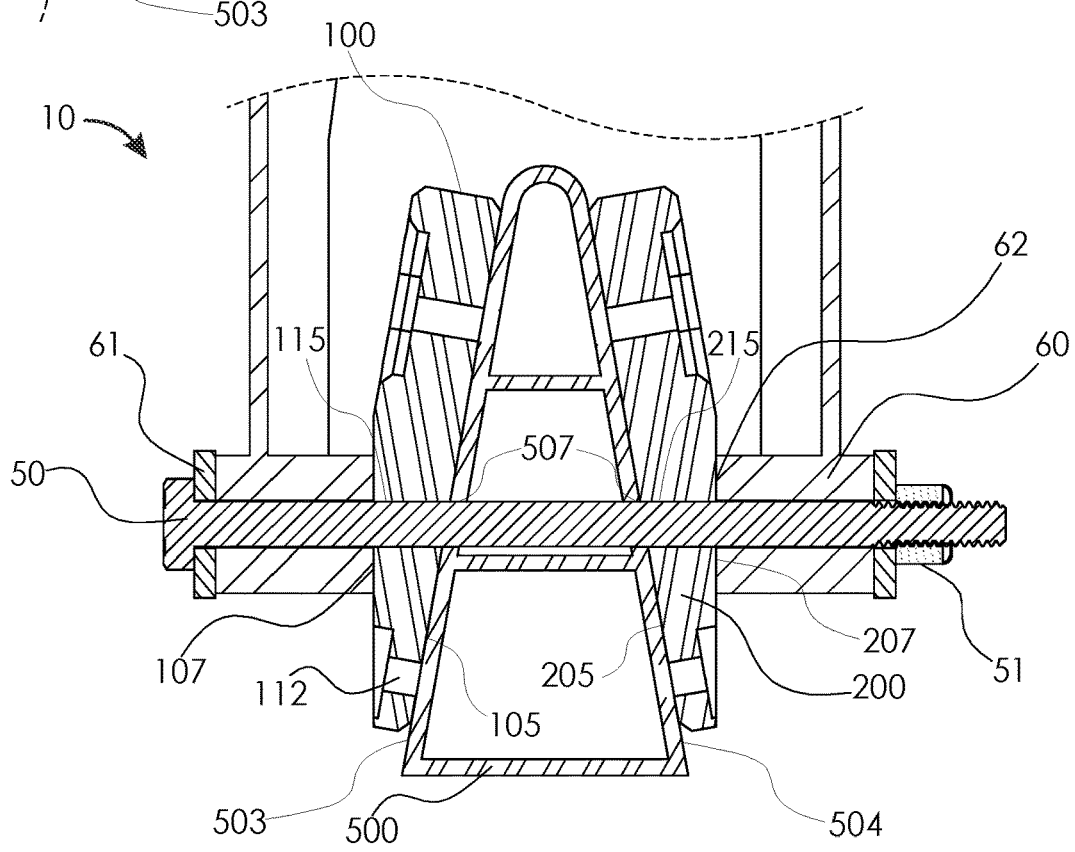
Figure 9:
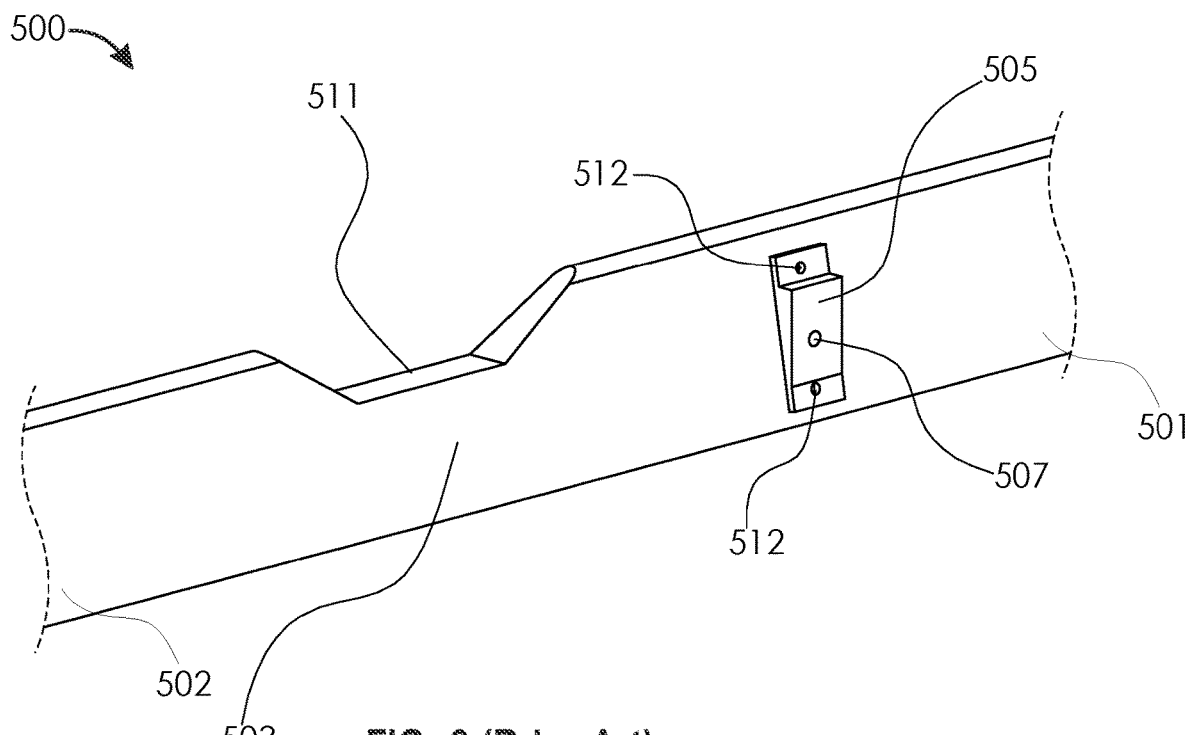
FIGS. 9 and 10 show an embodiment of a known monorail.
Figure 10:
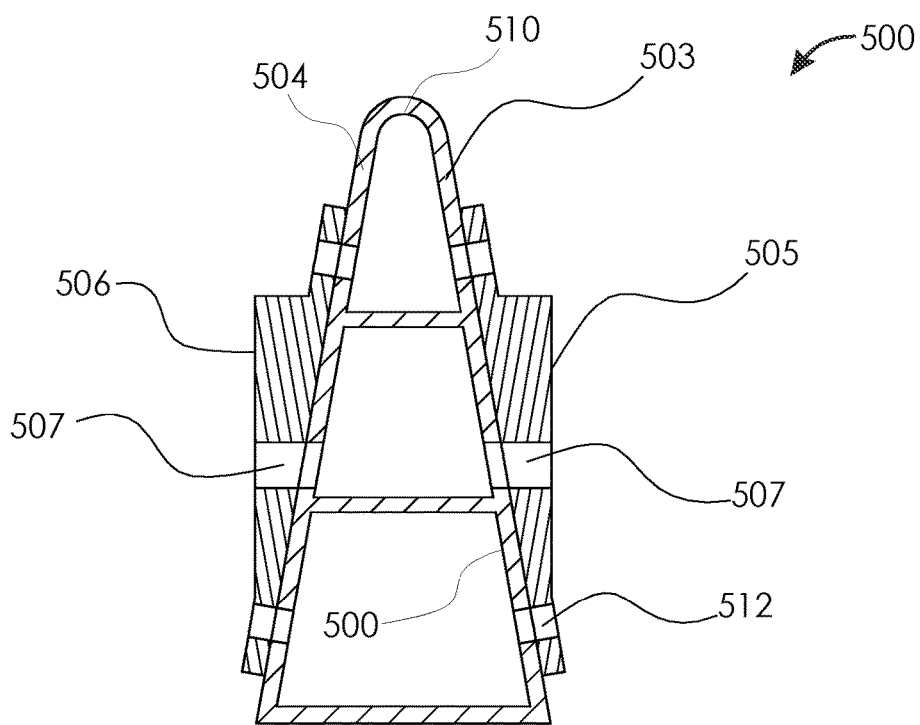

FIG. 3 illustrates rail brace system 10 attached to a monorail 500. Prior to installation of first brace 100 and/or second brace 200 it may be necessary to prepare monorail 500 by removing first mounting block 505 and second mounting block 506 (shown in FIGS. 9 and 10). For purposes of illustration, mechanical fasteners have been omitted from the plurality of fastener holes 112 and not all fastener holes have been labeled. FIG. 4 shows a cross-sectional view of FIG. 3 through suspension arm 60 and bolt 50.

As best shown in FIG. 4, inner surface 105 of first brace 100 has been placed against first side 503 of monorail 500. In some embodiments, adhesive may be placed between inner surface 105 and first side 503. Inner surface 205 of second brace 200 has been placed against second side 504 of monorail 500. In some embodiments, adhesive may be placed between inner surface 205 and second side 504.

Opening 115 of first brace 100 and opening 215 of second brace 200 are aligned with suspension mount hole 507 extending from first side 503 to second side 504 of monorail 500. Outer surface 107 of first brace 100 and outer surface 207 of second brace 200 each interface with a portion of suspension arm 60. Bolt 50 extends through a first portion 61 of suspension arm 60, opening 115 of first brace 100, suspension mount hole 507 of monorail 500, opening 215 of second brace 200, and a second portion 62 of suspension arm 60. Bolt 50 and a nut 51 are used to secure first brace 100 and second brace 200 to monorail 500 and inner surface 105 is maintained coincident with first side 503 and inner surface 205 is maintained coincident with second side 504. Because bolt 50 extends through first brace 100 and second brace 200, forces transferred from monorail 500 into first brace 100 and/or second brace 200 can be further transferred through suspension arm 60 into the suspension of the snowmobile. Likewise, forces upon suspension arm 60 can be transferred into first brace 100 and/or second brace 200 rather than directly into monorail 500.

As shown in FIG. 3, middle section 130 of first brace 100 is aligned, along the length of the monorail 500, with the portion of monorail 500 including recess 511. Recess 131 of middle section 130 may extend above recess 511 of monorail 500. Each of first brace 100 and second brace 200 have a sufficient length to extend at least to a midpoint of recess 511 and, preferably, beyond the midpoint to provide support to monorail 500.

Figure 5:
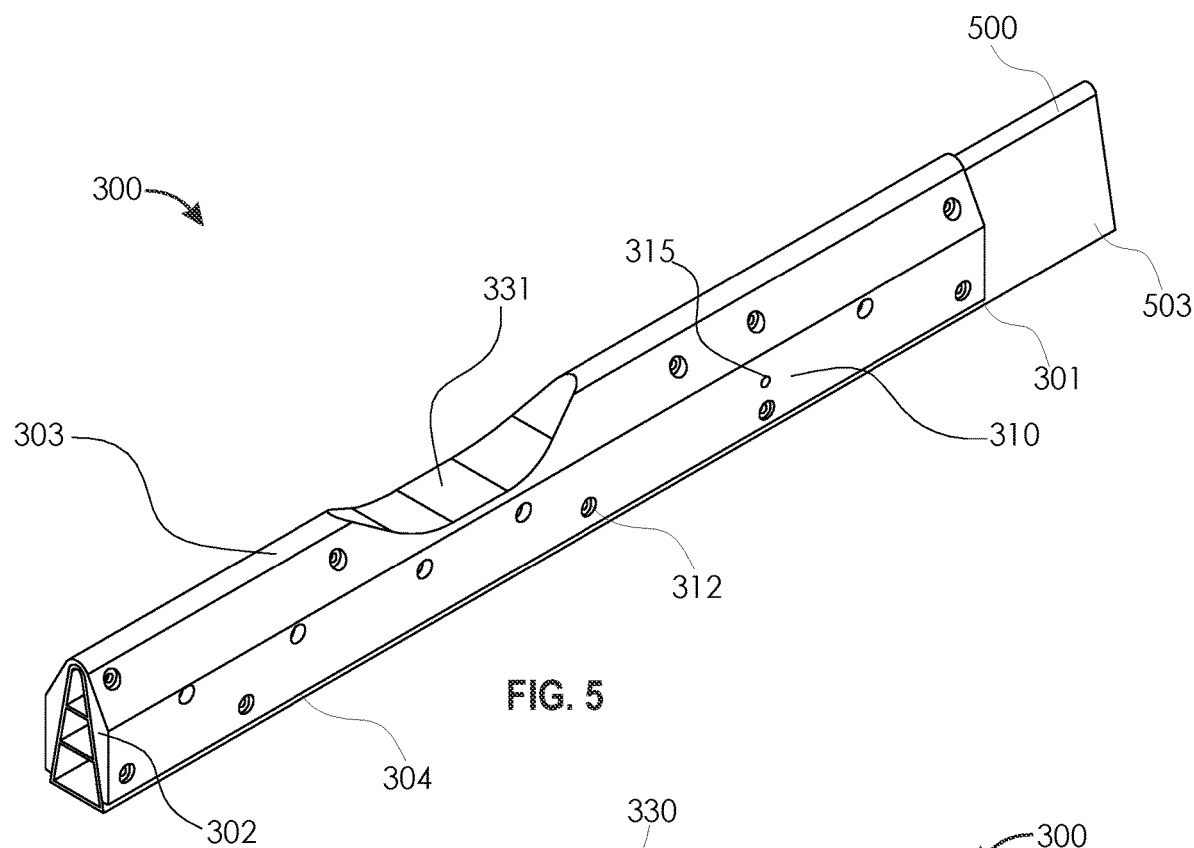
FIGS. 5 and 6 show an embodiment of a rail brace system installed on a monorail.
Figure 6:
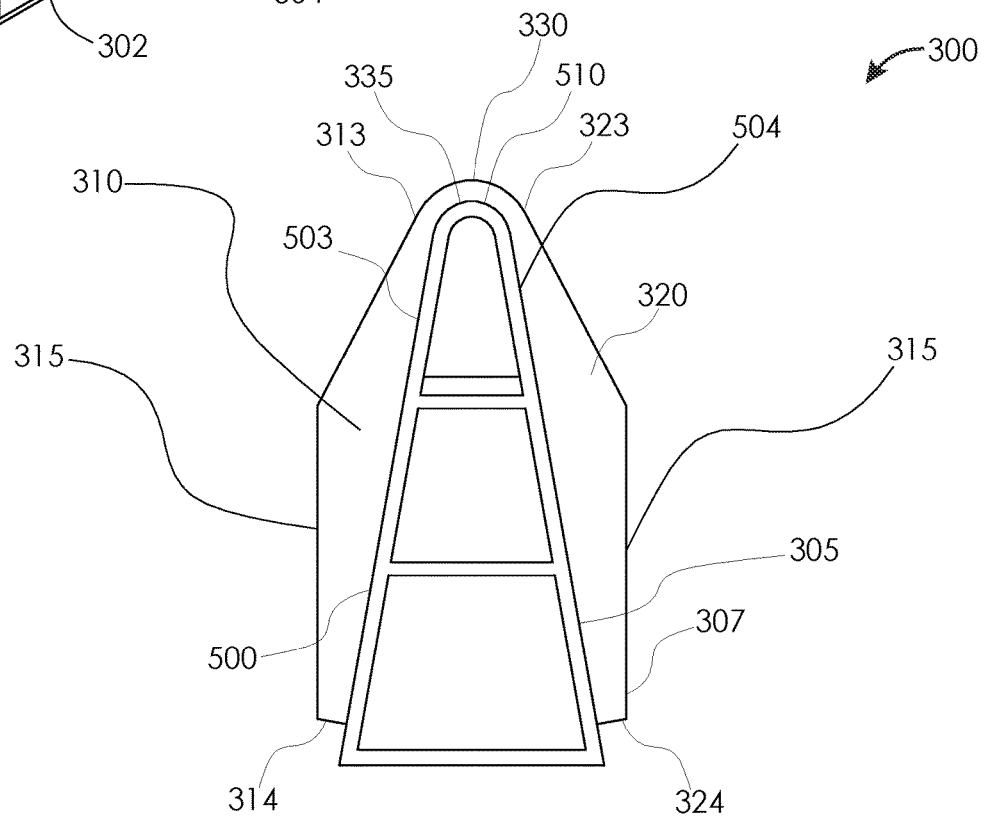

FIG. 5 shows an embodiment of a rail brace 300 installed on a monorail 500. FIG. 6 shows a cross-section view of FIG. 5. Rail brace 300 is a single piece brace formed of a first brace 310, a second brace 320, and an upper brace 330. Rail brace 300 may be placed over the top of monorail 500. First brace 310 is shaped complementary to first side 503 of monorail 500 and second brace 320 is shaped complementary to second side 504 of monorail 500.

Rail brace 300 includes a first end 301, a second end 302, a length extending from first end 301 to second end 302, a top side 303 extending along the length, a bottom side 304 extending along the length, and a height extending from top side 303 to bottom side 304. Rail brace 300 includes a plurality of fastener holes 312 to receive mechanical fasteners to connect rail brace 300 to monorail 500. First brace 310 extends along a height of rail brace 300 between a top side 313 and a bottom side 314. Second brace 320 extends along the height of rail brace 300 between a top side 323 and a bottom side 324. Bottom side 314 and bottom side 324 collectively form bottom side 304. Rail brace 300 includes an opening 315 extending through first brace 310 and second brace 320. Opening 315 is complementary to a suspension mount hole of monorail 500. Rail brace 300 includes an inner surface 305 and an outer surface 307. Outer surface 307 interfaces with a portion of suspension arm 60 (not shown in FIGS. 5 and 6) to form an integral mounting block. The integral mounting block may extend from first end 301 to second end 302. Inner surface 305 interfaces with the sides of monorail 500. Inner surface 305 may include inner surface 335 positioned on upper brace 330 to interface with top side 510 of monorail 500. Upper brace 330 connects top side 313 of first brace 310 to top side 323 of second brace 320. First brace 310 may be tapered towards upper brace 330. Second brace 320 may be tapered towards upper brace 330. Upper brace 330 may be curved.

Monorail 500 includes a top side 510 extending along the length and between first side 503 and second side 504. Upper brace 330 may be shaped complementary to top side 510 of monorail 500. First brace 310 may have some or all of the same features as first brace 100 shown in FIG. 1. Second brace 320 may have some or all of the same features as second brace 200 shown in FIG. 1. Rail brace 300 may be used in place of first brace 100 and second brace 200. Rail brace 300 may include one or more internal cavities, which may be advantageous for rigidity and/or weight savings. Internal cavities may be formed during an extrusion process. The inner surfaces 305 of first brace 310 and second brace 320 may be at an angle of between 15 and 60 degrees with respect to each other. In some embodiments, inner surfaces 305 of first brace 310 and second brace 320 may be at an angle of 20 degrees.

Rail brace 300 may include a recess 331 extending laterally between first brace 310 and second brace 320. Recess 331 may be curved along the length of rail brace 300. Recess 331 may be shaped to provide clearance for suspension components of the snowmobile. In some embodiments, a portion of rail brace 300 may extend laterally between first brace 310 and second brace 320 to form a closed recess. In other embodiments, recess 331 may be open. In some embodiments, rail brace 300 is extruded as a single piece.

Figure 7:
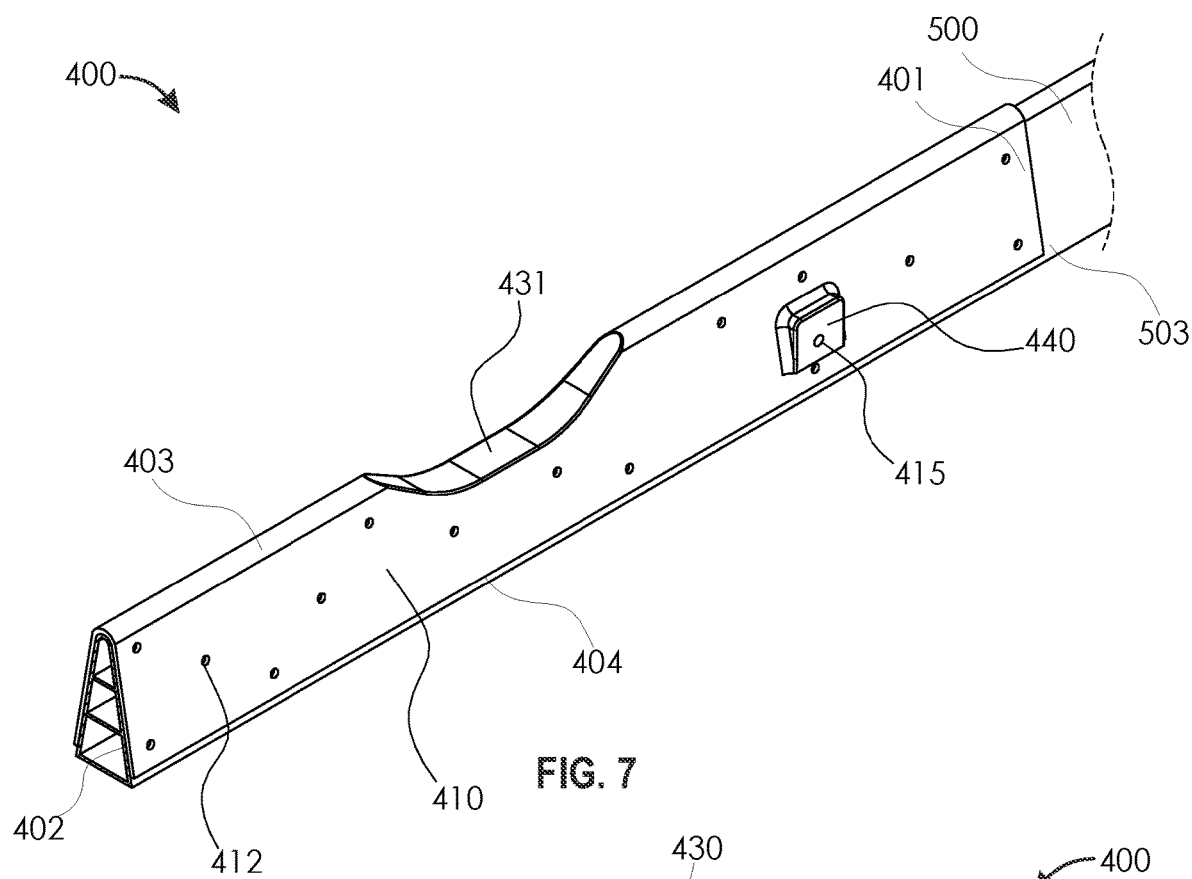
FIGS. 7 and 8 show an embodiment of a rail brace system installed on a monorail.
Figure 8:
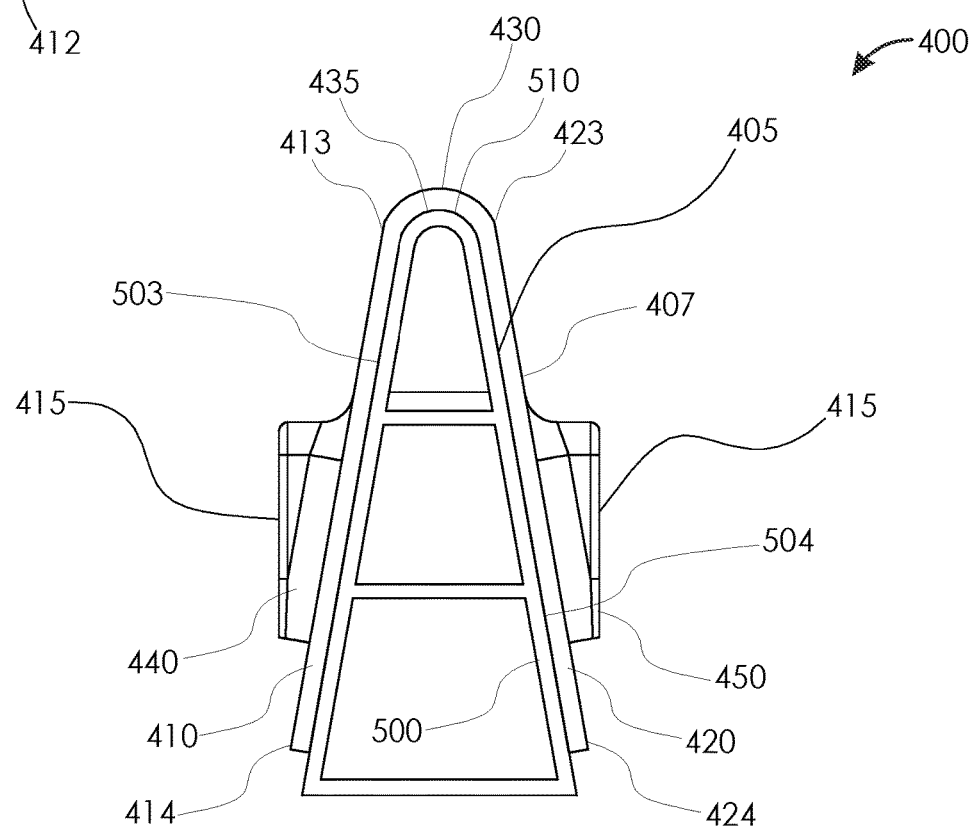

FIG. 7 shows an embodiment of a rail brace 400 installed on a monorail 500. FIG. 8 shows a cross-section view of FIG. 7. Rail brace 400 is a single piece brace formed of a first brace 410, a second brace 420, and an upper brace 430. First brace 410 is shaped complementary to first side 503 of monorail 500 and second brace 420 is shaped complementary to second side 504 of monorail 500.

Rail brace 400 includes a first end 401, a second end 402, a length extending from first end 401 to second end 402, a top side 403 extending along the length, a bottom side 404 extending along the length, and a height extending from top side 403 to bottom side 404. Rail brace 400 includes a plurality of fastener holes 412 to receive mechanical fasteners to connect rail brace 400 to monorail 500. First brace 410 extends along a height of rail brace 400 between a top side 413 and a bottom side 414. Second brace 420 extends along the height of rail brace 400 between a top side 423 and a bottom side 424. Bottom side 414 and bottom side 424 collectively form bottom side 404. Rail brace 400 includes an opening 415 extending through first brace 410 and second brace 420. Opening 415 is complementary to a suspension mount hole of monorail 500. Rail brace 400 includes an inner surface 405 and an outer surface 407. Inner surface 405 interfaces with the sides of monorail 500. Inner surface 405 may include inner surface 435 positioned on upper brace 430 to interface with top side 510 of monorail 500. Upper brace 430 connects top side 413 of first brace 410 to top side 423 of second brace 420. First brace 410 and upper brace 430 may have the same thickness.

Rail brace 400 includes a first mounting block 440 protruding from the outer surface 407 of first brace 410 and a second mounting block 450 protruding from the outer surface 407 of second brace 420. First mounting block 440 is integral to first brace 410. Second mounting block 450 is integral to second brace 420. First mounting block 440 and second mounting block 450 interface with portions of suspension arm 60 (not shown in FIGS. 7 and 8). First mounting block 440 and second mounting block 450 may be tapered towards the bottom sides 414, 424 of the first and second braces 410, 420. First mounting block 440 and second mounting block 450 may form vertical surfaces around opening 415 to interface with a portion of suspension arm 60 (shown in FIG. 3).

Monorail 500 includes a top side 510 extending along the length and between first side 503 and second side 504. Upper brace 430 may be shaped complementary to top side 510 of monorail 500. First brace 410 may have some or all of the same features as first brace 100 shown in FIG. 1. Second brace 420 may have some or all of the same features as second brace 200 shown in FIG. 1. Rail brace 400 may be used in place of first brace 100 and second brace 200 or in place of rail brace 300. The inner surfaces 405 of first brace 410 and second brace 420 may be at an angle of between 15 and 60 degrees with respect to each other. In some embodiments, inner surfaces 405 of first brace 410 and second brace 420 may be at an angle of 20 degrees.

Rail brace 400 may include a recess 431 extending laterally between first brace 410 and second brace 420. Recess 431 may be curved along the length of rail brace 400. Recess 431 may be shaped to provide clearance for suspension components of the snowmobile. In some embodiments, rail brace 400 is forged as a single piece. In some embodiments, rail brace 400 is stamped or machined as a single piece.

Figure 11:
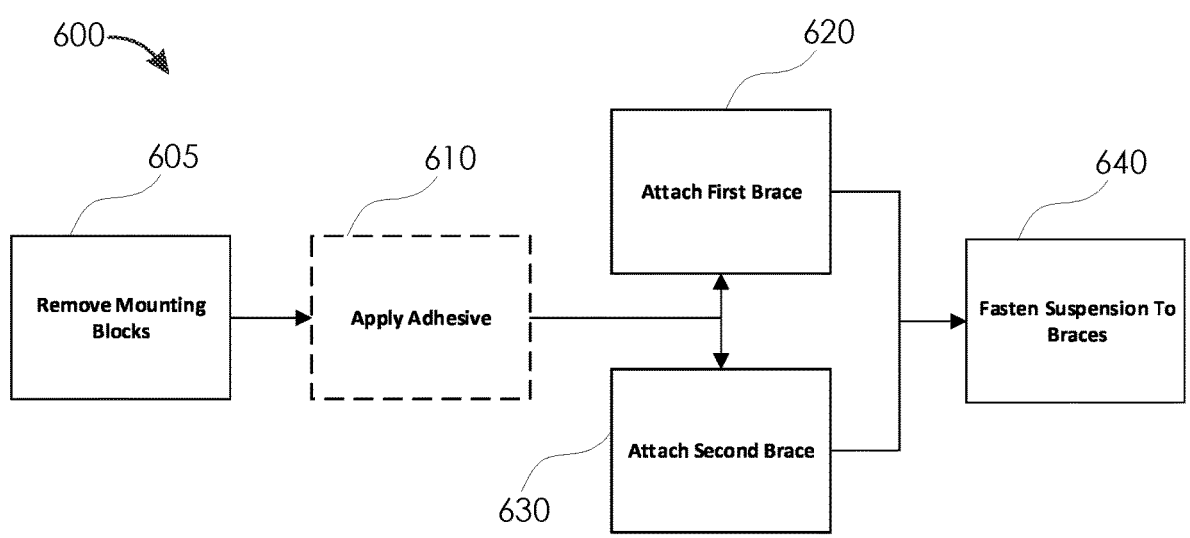
FIG. 11 is a flow diagram of a method of bracing a monorail of a snowmobile.

FIG. 11 is a flow diagram of a method 600 of bracing a monorail of a snowmobile. Method 600 may include Action 605 of preparing the monorail by removing mounting blocks attached to the sides of the monorail. Method 600 includes Action 620 of attaching a first brace to a first side of the monorail. The monorail includes a first side, a second side opposite the first side, and a suspension mount hole extending through the first side. The first brace includes a first opening that is aligned with the suspension mount hole. Method 600 includes Action 640 of fastening the suspension to the first brace and the second brace. This may include inserting a bolt through the first brace and the suspension mount hole. Action 640 may include inserting the bolt through a suspension arm of the snowmobile. Method 600 may include Action 610 of placing an adhesive between the first brace and the monorail.

Method 600 also includes Action 630 of attaching a second brace to the second side of the monorail. The second brace includes a second opening that is aligned with the suspension mount hole of the monorail. Furthermore, Action 640 may include inserting the bolt through the first brace, the suspension mount hole of the monorail, and the second brace.

In some embodiments, the first brace and the second brace are part of a single piece and Actions 620 and 630 are performed simultaneously by placing the single piece over the monorail.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A rail brace system for use with a monorail of a snowmobile, the rail brace system comprising:
   a brace having a first end, a second end, a length extending from the first end to the second end, a top side, a bottom side, a height extending from the top side to the bottom side, an inner surface, an outer surface, a width extending between the inner surface and the outer surface, an upper portion extending downward from the top side, and a lower portion extending upward from the bottom side, a first portion of the outer surface is on the upper portion and a second portion of the outer surface is on the lower portion, the inner surface is shaped complementary to a first side of a monorail of a snowmobile, wherein the brace includes an opening extending through the width, a center of the opening is positioned at least two inches from the second end, the opening is positioned along the length of the brace to be concentric to a suspension mount hole of the monorail and the outer surface around the opening is configured to provide a mounting surface for a suspension arm of the snowmobile, and wherein the brace includes a mounting block protruding from the outer surface, the opening extending through the mounting block, the mounting block is integral to the brace.

2. The rail brace system of claim 1, wherein the inner surface shaped complementary to the first side of the monorail comprises the inner surface is shaped complementary to the first side of a single-beam rear suspension.

3. The rail brace system of claim 1, wherein the brace includes a plurality of sections extending continuously along its length, the plurality of sections including a first section that includes the first end, a second section that includes the second end, and a middle section positioned between the first end and the second end, the middle section including a recess on the top side of the brace.

4. The rail brace system of claim 3, wherein the top side is curved along its length at a transition between the first section and the middle section.

5. The rail brace system of claim 3, wherein the opening is positioned in the first section.

6. The rail brace system of claim 1, wherein the brace includes a plurality of fastener holes configured to receive mechanical fasteners, the plurality of fastener holes spread along the length.

7. The rail brace system of claim 1, wherein the brace includes one or more ribs configured to increase rigidity of the brace.

8. The rail brace system of claim 1, wherein the brace is a first brace, and further comprising:
   a second brace having a first end, a second end, a length extending from the first end to the second end, a top side, a bottom side, a height extending from the top side to the bottom side, an inner surface, an outer surface, and a width extending between the inner surface and the outer surface, the inner surface is shaped complementary to a second side of the monorail; and
   an upper brace connecting the top side of the first brace to the top side of the second brace, and wherein the first brace, the second brace, and the upper brace are a single piece.

9. The rail brace system of claim 1, wherein the center of the opening is positioned at least ten inches from the second end.

10. A rail brace system for use with a monorail of a snowmobile, the rail brace system comprising:
    a first brace having a first end, a second end, a length extending from the first end to the second end, a top side, a bottom side, a height extending from the top side to the bottom side, an inner surface, an outer surface, a width extending between the inner surface and the outer surface, an upper portion extending downward from the top side, and a lower portion extending upward from the bottom side, a first portion of the outer surface is on the upper portion and a second portion of the outer surface is on the lower portion, the inner surface is shaped complementary to a first side of a monorail of a snowmobile, wherein the first brace includes an opening extending through the width, a center of the opening is positioned at least two inches from the second end, the opening is positioned along the length of the first brace to be concentric to a suspension mount hole of the monorail and the outer surface around the opening is configured to provide a mounting surface for a suspension arm of the snowmobile;

a second brace having a first end, a second end, a length extending from the first end to the second end, a top side, a bottom side, a height extending from the top side to the bottom side, an inner surface, an outer surface, and a width extending between the inner surface and the outer surface, the inner surface is shaped complementary to a second side of the monorail; and an upper brace connecting the top side of the first brace to the top side of the second brace, and wherein the first brace, the second brace, and the upper brace are a single piece.

11. The rail brace system of claim 10, wherein the first portion of the outer surface is not parallel to the second portion of the outer surface.

12. The rail brace system of claim 11, wherein a thickness of the lower portion is tapered towards the bottom side.

13. The rail brace system of claim 11, wherein the opening is located in the lower portion.

14. The rail brace system of claim 10, wherein the inner surface of the upper brace is curved.

15. The rail brace system of claim 10, wherein the inner surface shaped complementary to the first side of the monorail comprises the inner surface is shaped complementary to the first side of a single-beam rear suspension.

16. The rail brace system of claim 10, wherein the first brace includes a plurality of sections extending continuously along its length, the plurality of sections including a first section that includes the first end, a second section that includes the second end, and a middle section positioned between the first end and the second end, the middle section including a recess on the top side of the brace.

17. The rail brace system of claim 16, wherein the top side is curved along its length at a transition between the first section and the middle section.

18. The rail brace system of claim 10, wherein the first brace includes one or more ribs configured to increase rigidity of the first brace.

19. A rail brace system for a snowmobile, the rail brace system comprising:

a monorail including a first side, a second side opposite the first side, and a suspension mount hole extending from the first side to the second side;

a suspension arm having a first portion and a second portion;

a first brace having a first end, a second end, a length extending from the first end to the second end, an inner surface complementary to the first side of the monorail, an outer surface, a width extending between the inner surface and the outer surface, and a first opening aligned with the suspension mount hole of the monorail, a center of the first opening is positioned at least two inches from the second end, the outer surface of the first brace forming a first mounting block that is integral to the first brace, the first opening extending through the first mounting block;

a second brace having a first end, a second end, a length extending from the first end to the second end, an inner surface complementary to the second side of the monorail, an outer surface, a width extending between the inner surface and the outer surface, and a second opening aligned with the suspension mount hole of the monorail, a center of the second opening is positioned at least two inches from the second end, the outer surface of the second brace forming a second mounting block that is integral to the second brace, the second opening extending through the second mounting block; and a bolt extending through the suspension arm, the opening of the first brace, the suspension mount hole of the monorail, and the second brace, wherein the bolt maintains contact between the first mounting block and the first portion of the suspension arm and maintains contact between the second mounting block and the second portion of the suspension arm.

20. The rail brace system of claim 19, further comprising an upper brace connecting a top side of the first brace to a top side of the second brace, and wherein the first brace, the second brace, and the upper brace are a single piece.

21. The rail brace system of claim 20, wherein the inner surface of the first brace and the inner surface of the second brace are at an angle of between 15 and 60 degrees with respect to each other.

22. The rail brace system of claim 19, wherein the first brace includes an upper portion extending downward from a top side of the first brace, and a lower portion extending upward from a bottom side of the first brace, a first portion of the outer surface is on the upper portion and a second portion of the outer surface is on the lower portion, the first portion of the outer surface is not parallel to the second portion of the outer surface.

23. The rail brace system of claim 22, wherein a thickness of the lower portion is tapered towards the bottom side.

24. The rail brace system of claim 19, wherein the first mounting block protruding from the outer surface of the first brace.

25. The rail brace system of claim 19, wherein the monorail includes a recess on a top side of the monorail, and each of the first brace and the second brace extend at least to a midpoint of the recess.

26. A method for bracing a monorail of a snowmobile, the method comprising:

attaching a first brace to a first side of a monorail of a snowmobile, the monorail including the first side, a second side opposite the first side, a front end, a rear end, a length extending from the front end to the rear end, a mounting block attached to the first side of the monorail, and a suspension mount hole extending through the first side, wherein the first brace includes a first opening that is aligned with the suspension mount hole of the monorail, wherein the first brace extends at least two inches from a center of the first opening towards the front end of the monorail;

removing the mounting block attached to the first side of the monorail before attaching the first brace to the first side of the monorail; and fastening both the first brace and a suspension arm of the snowmobile to the monorail using the suspension mount hole of the monorail.

27. The method of claim 26, wherein the suspension mount hole extends through the second side of the monorail, and further comprising attaching a second brace to the second side of the monorail, the second brace includes a second opening that is aligned with the suspension mount hole of the monorail, and further comprising fastening the second brace to the monorail of the snowmobile using the suspension mount hole of the monorail.

28. The method of claim 27, wherein the first brace and the second brace are part of a single piece with an upper brace connecting a top side of the first brace to a top side of the second brace, and attaching the first brace and attaching the second brace include placing the single piece over the monorail.

29. The method of claim 26, wherein fastening both the first brace and a suspension arm of the snowmobile to the monorail using the suspension mount hole of the monorail includes inserting a bolt through the suspension mount hole of the monorail, the first opening of the first brace, and the suspension arm.

30. The method of claim 29, wherein the first brace is positioned between the first side of the monorail and the suspension arm.

\* \* \* \* \*